(12) United States Patent
Kusaki et al.

(10) Patent No.: US 7,802,996 B2
(45) Date of Patent: Sep. 28, 2010

(54) IMAGE PICKUP APPARATUS

(75) Inventors: Kenji Kusaki, Kanagawa (JP);
Hironobu Oda, Aichi (JP)

(73) Assignee: Sony Corporation (JP)

( * ) Notice: Subject to any disclaimer, the term of this patent is extended or adjusted under 35 U.S.C. 154(b) by 524 days.

(21) Appl. No.: 11/978,178

(22) Filed: Oct. 26, 2007

(65) Prior Publication Data
US 2008/0174692 A1      Jul. 24, 2008

(30) Foreign Application Priority Data
Oct. 27, 2006      (JP) ............................ P2006-293036

(51) Int. Cl.
*H01R 12/00*      (2006.01)
(52) U.S. Cl. .................................... 439/76.1
(58) Field of Classification Search .................. 439/72, 439/77, 78, 76.1, 607.1, 81, 357, 67
See application file for complete search history.

(56) References Cited

U.S. PATENT DOCUMENTS

| | | | |
|---|---|---|---|
| 7,147,481 B2 * | 12/2006 | Yang | 439/71 |
| 7,288,003 B2 * | 10/2007 | Ono et al. | 439/607.01 |
| 7,387,536 B2 * | 6/2008 | Wang | 439/607.41 |
| 7,422,482 B2 * | 9/2008 | Wang | 439/607.01 |
| 7,467,975 B2 * | 12/2008 | Ma | 439/607.01 |
| 7,632,132 B2 * | 12/2009 | Nishio et al. | 439/357 |
| 7,699,619 B2 * | 4/2010 | Mizumura | 439/71 |
| 7,717,744 B2 * | 5/2010 | Ma | 439/607.1 |
| 2008/0311782 A1 * | 12/2008 | Nishio et al. | 439/357 |
| 2009/0035992 A1 * | 2/2009 | Wu | 439/607 |
| 2009/0042418 A1 * | 2/2009 | Wu | 439/81 |
| 2009/0104797 A1 * | 4/2009 | Tseng et al. | 439/76.1 |
| 2009/0181561 A1 * | 7/2009 | Kusaki et al. | 439/72 |
| 2009/0286410 A1 * | 11/2009 | Asai | 439/78 |

FOREIGN PATENT DOCUMENTS

JP      2005-086341 A      3/2005

* cited by examiner

*Primary Examiner*—T C Patel
*Assistant Examiner*—Phuong Nguyen
(74) *Attorney, Agent, or Firm*—Lerner, David, Littenberg, Krumholz & Mentlik, LLP

(57) ABSTRACT

An image pickup apparatus may include a camera module having a camera body with an imaging optical system, an image sensing element, a signal processor, a substrate, and connection pieces formed on the substrate; and a socket on which the camera module is mounted. The socket may include an insulating socket body acceptable the camera module and having a bottom wall, four side walls, and connection terminals. The side wall may have an elastic piece for elastically supporting the camera module inside the four side walls while securing spaces to the four side walls and the connection pieces may be connected to the connection terminals. The elastic piece may be elastically deformable in the thickness direction of the side wall and an elastic deformation notched portion may be formed on the side wall corresponding to the elastic piece for the elastic piece in elastically.

10 Claims, 10 Drawing Sheets

IMAGE PICKUP APPARATUS

CROSS-REFERENCE TO RELATED APPLICATIONS

This application claims priority from Japanese Patent Application No. JP 2006-293036 filed in the Japanese Patent Office on Oct. 27, 2006, the entire content of which is incorporated herein by reference.

BACKGROUND OF THE INVENTION

1. Field of the Invention

The present invention relates to an image pickup apparatus to be built in a portable electronic instrument.

2. Description of the Related Art

Recently, electronic instruments, such as mobile phones and PDAs (personal digital assistants) having camera modules built therein have been provided.

The camera module includes a camera body having an imaging optical system assembled therein, an image sensing element for imaging an object image directed by the imaging optical system, a signal processor for performing predetermined signal processing by taking an imaging signal from the image sensing element, and a substrate attached to the camera body (see Japanese Unexamined Patent Application Publication No. 2005-86341).

SUMMARY OF THE INVENTION

Such a camera module may be frequently built in a small-sized potable electronic instrument such as a mobile phone. Accordingly, not only durability against dropping shock and vibration, but also the miniaturizing in outer size has been demanded of the camera module along with compactification of the electronic instrument.

The present invention has been made in view of such situations, and it is desirable to provide an image pickup apparatus advantageous in miniaturizing while durability is ensured against vibration and impact.

An image pickup apparatus according to an embodiment of the present invention may include a camera module configured to include a rectangular plate-shaped camera body having an imaging optical system built therein to oppose one plane in a thickness direction, an image sensing element for imaging an object image directed by the imaging optical system, a signal processor for performing predetermined signal processing by taking an imaging signal outputted from the image sensing element, and a substrate attached on the other plane of the camera body in the thickness direction, and a plurality of connection pieces formed on a plane of the substrate opposite to the camera body; and a socket on which the camera module is mounted. The socket may include a socket body made of an insulating material with a size acceptable the camera module therein and having a rectangular bottom wall, four side walls raised from four sides of the bottom wall, and a plurality of connection terminals provided on the bottom wall to be connected to the plurality of connection pieces, respectively. Each of the side walls may be provided with an elastic piece that is elastically brought into contact with each of four sides continuing to each side of the one plane of the camera body so as to elastically support the camera module inside the four side walls and on the bottom wall, while spaces are being secured to the four side walls, in a state of the plurality of connection pieces connected to the plurality of connection terminals, respectively. The elastic piece may be provided to be elastically deformable in a thickness direction of the side wall where the elastic piece is arranged, and at a position of each side wall corresponding to the elastic piece, an elastic deformation notched portion may be formed for the elastic piece in elastically deforming.

According to the embodiment of the present invention, the camera module may therefore be elastically supported with the elastic pieces of the socket while spaces are being secured to the side walls of the socket, the elastic piece may be elastically deformable in the thickness direction of the side wall, and an elastic deformation notched portion may be formed on the side wall for the elastic piece in deforming, so that the large elastic stroke of the elastic piece may be ensured without increasing the image pickup apparatus in size. Accordingly, this apparatus is advantageous in elastically and securely supporting the camera module with the elastic pieces while the image pickup apparatus is being miniaturized.

DETAILED DESCRIPTION

First Embodiment

Then, a first embodiment of the present invention will be described with reference to the drawings.

Figure 1A:
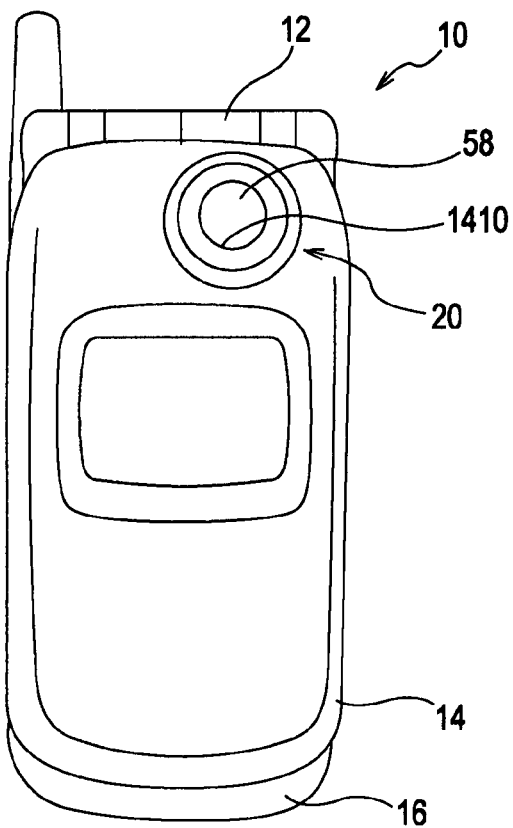
FIGS. 1A and 1B are exterior views of an electronic instrument having an image pickup apparatus 20 built therein according to an embodiment.
Figure 1B:
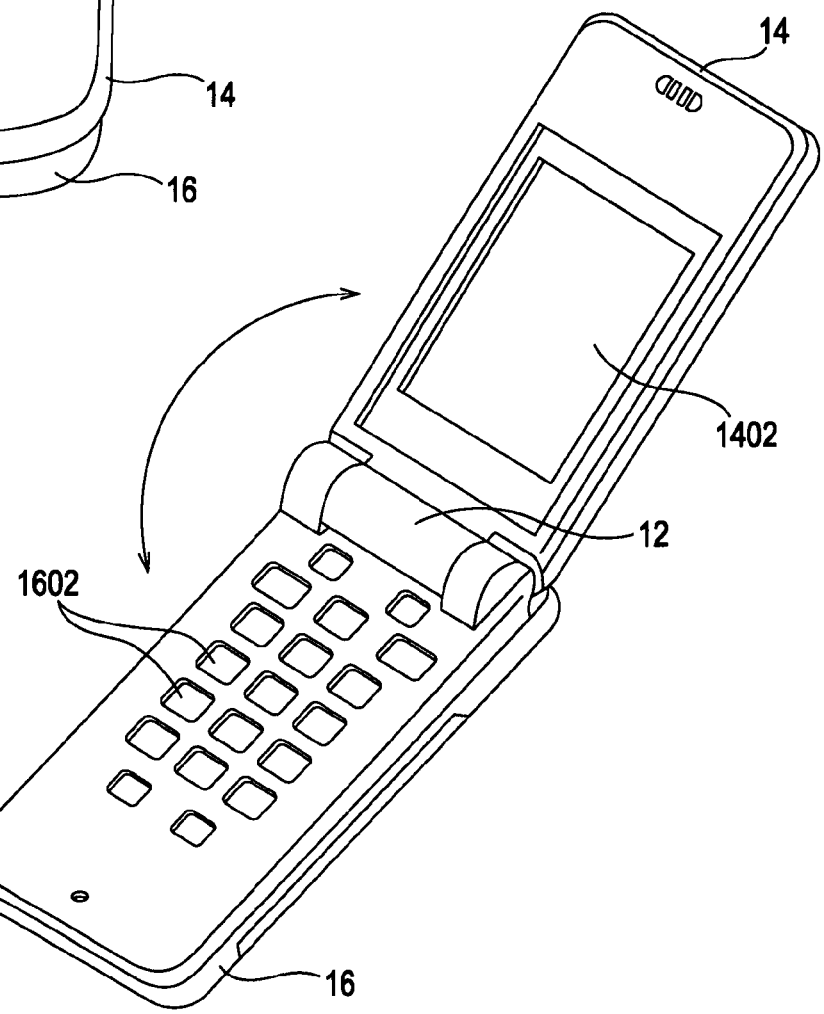

FIGS. 1A and 1B are exterior views of an electronic instrument having an image pickup apparatus 20 built therein according to the embodiment.

As shown in FIGS. 1A and 1B, an electronic instrument 10 is a mobile phone having first and second casings 14 and 16 foldably connected together with a hinge 12.

On the inner surface of the first casing 14, a liquid crystal display panel 1402 is provided and on the inner surface of the second casing 16, operation switches 1602 such as ten-keys and functional keys are provided.

The image pickup apparatus 20 is built in the rear anchor of the first casing 14 and images picked up by the image pickup apparatus 20 are displayed on the liquid crystal display panel 1402.

Figure 2:
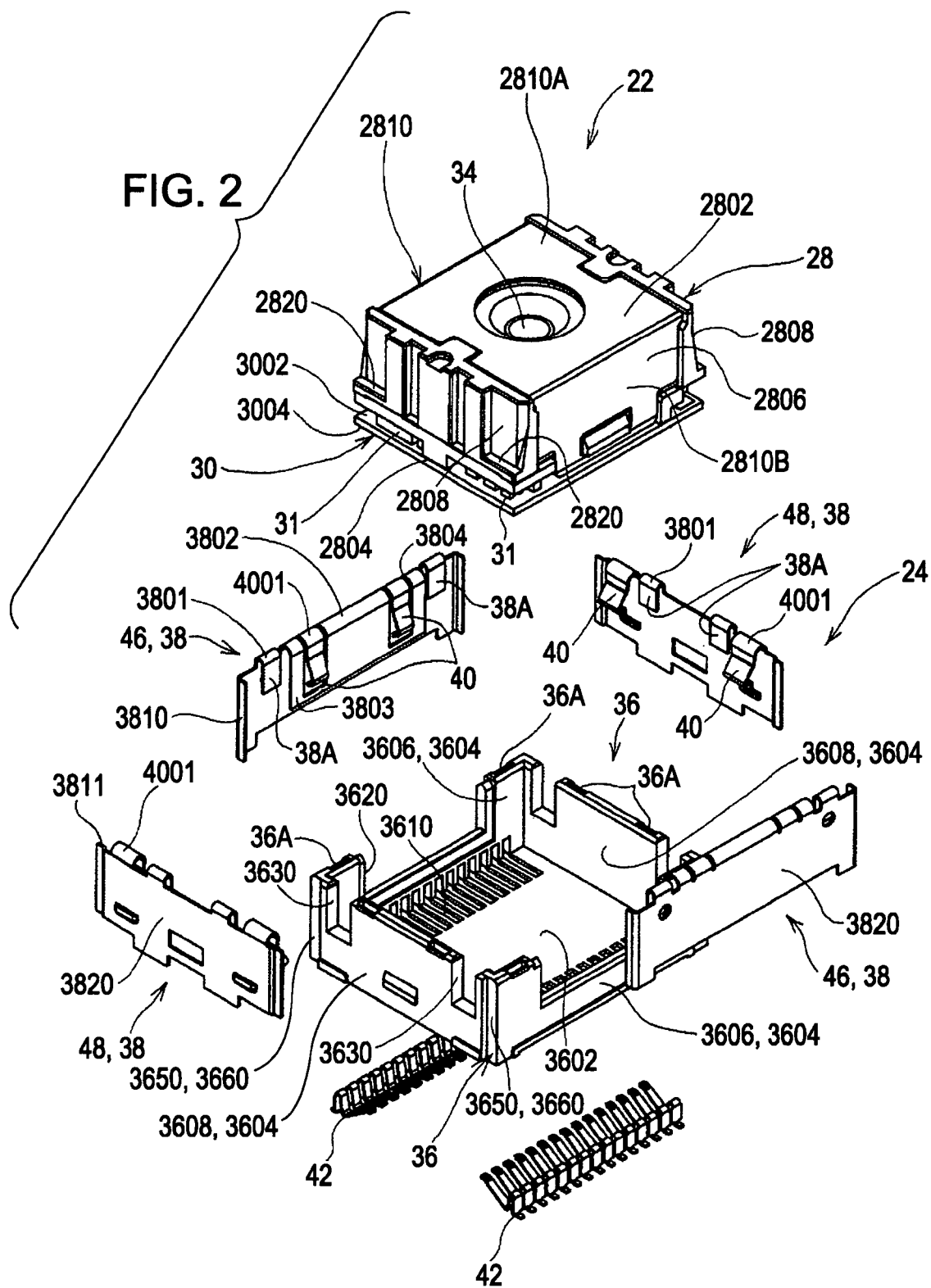
FIG. 2 is an exploded perspective view of a camera module 22 and a socket 24 constituting the image pickup apparatus 20.
Figure 3:
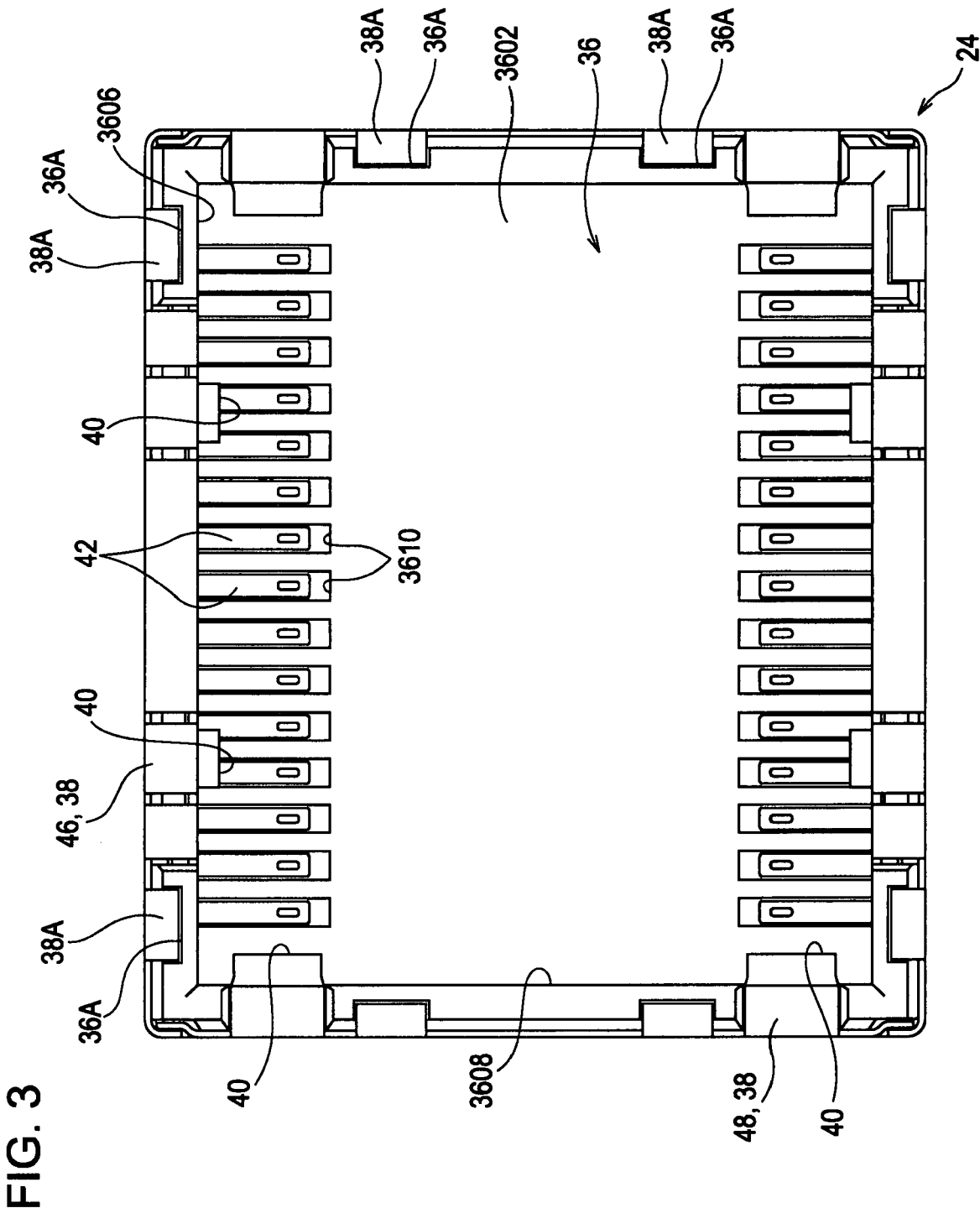
FIG. 3 is a plan view of the socket 24.
Figure 4:
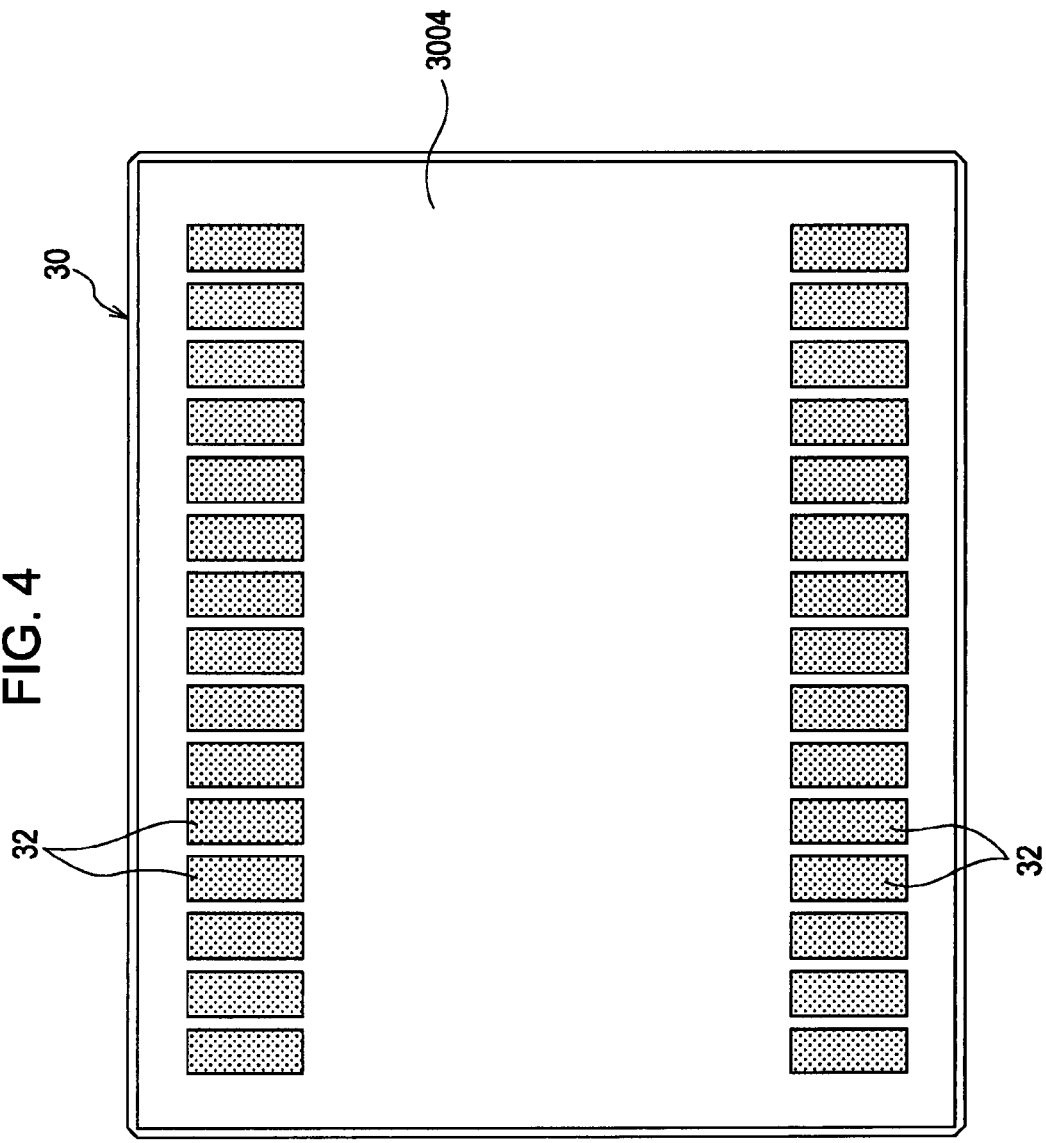
FIG. 4 is a plan view of a substrate 30.
Figure 5:
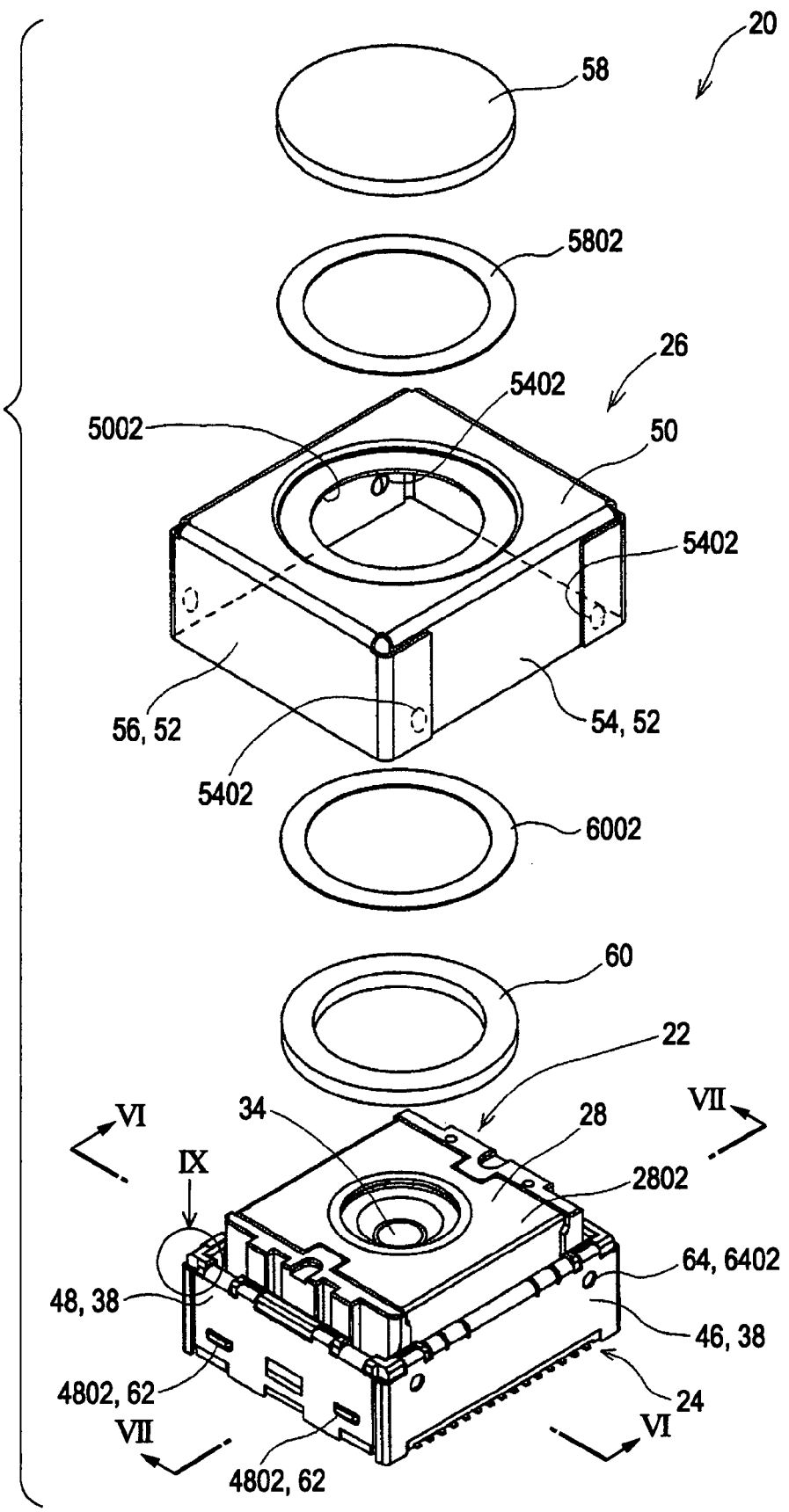
FIG. 5 is an exploded perspective view of the camera module 22, the socket 24, and a cover 26.
Figure 6:
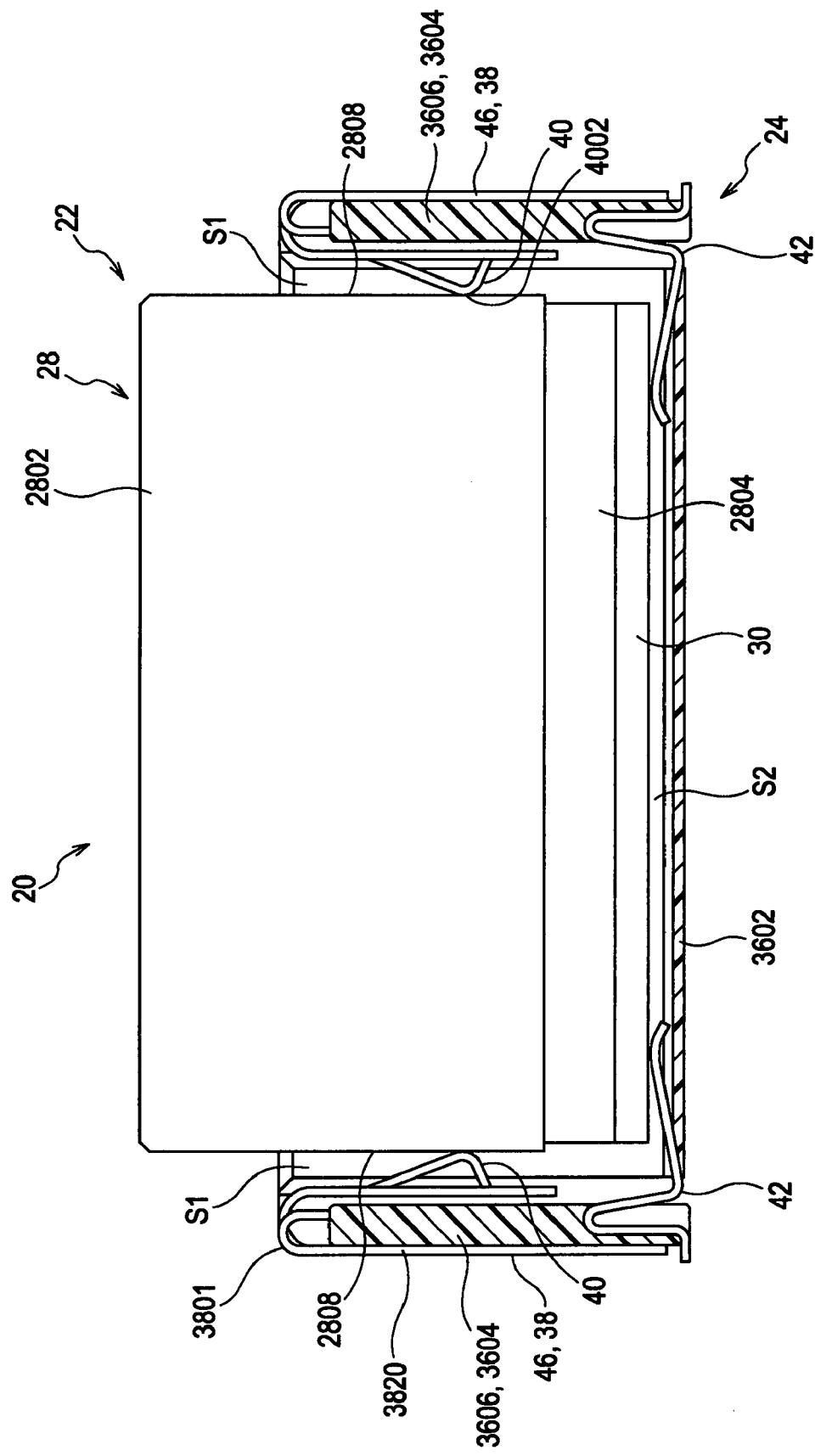
FIG. 6 is a sectional view at the line A-A of FIG. 5.
Figure 7:
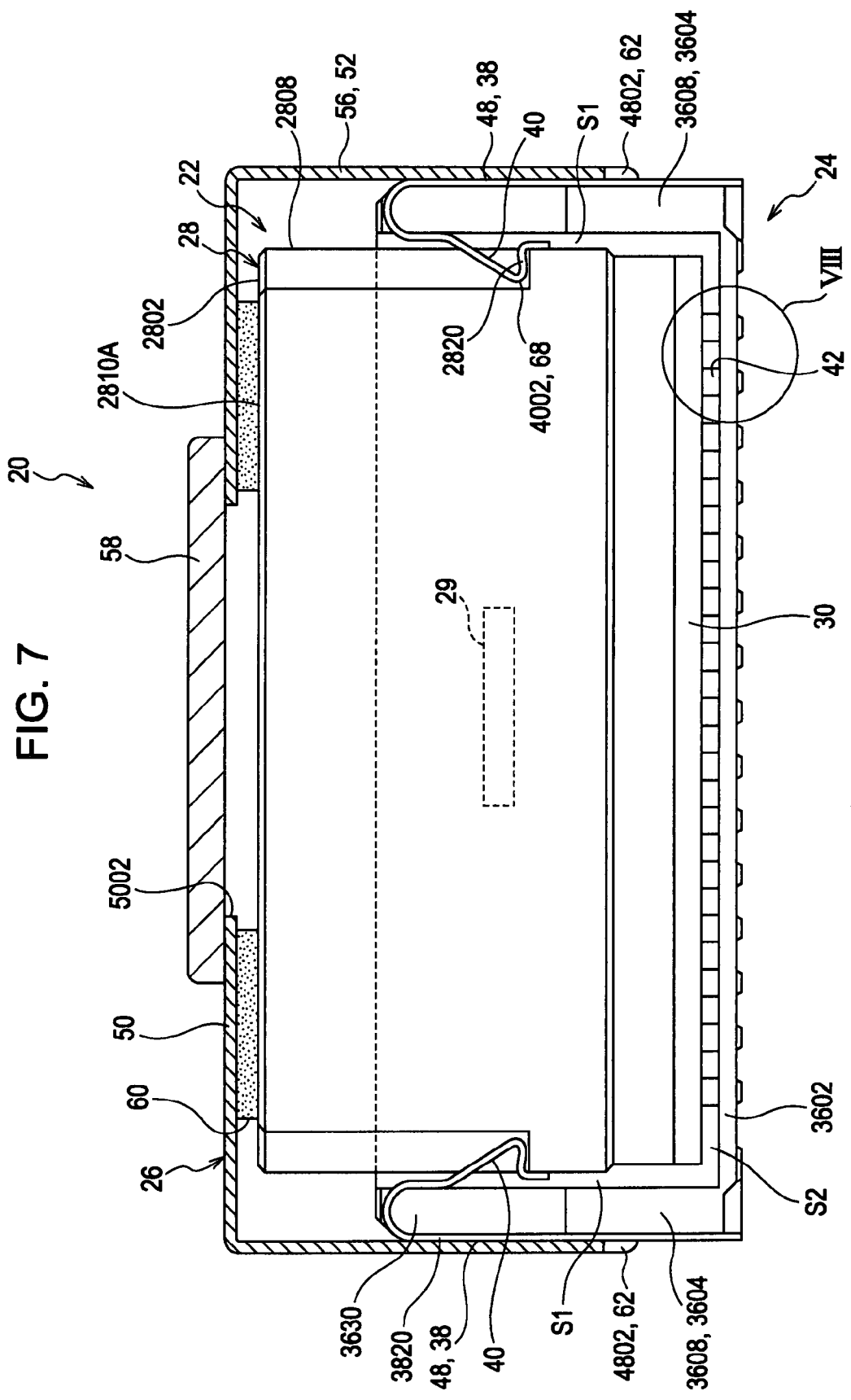
FIG. 7 is a sectional view at the line B-B of FIG. 5.
Figure 8:
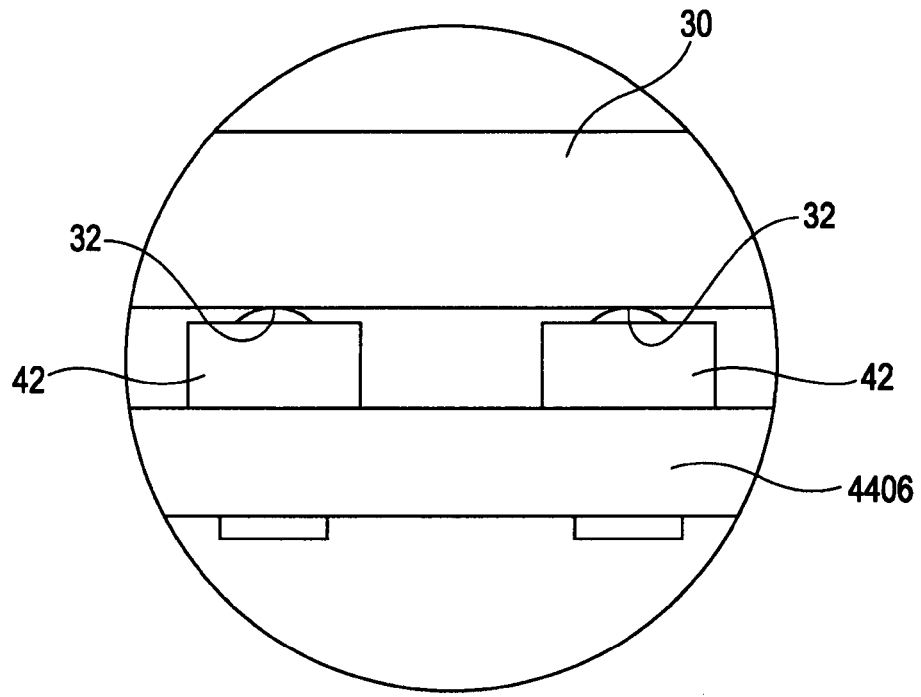
FIG. 8 is an enlarged view of the portion A of FIG. 7.

FIG. 2 is an exploded perspective view of a camera module 22 and a socket 24 constituting the image pickup apparatus 20; FIG. 3 is a plan view of the socket 24; FIG. 4 is a plan view of a substrate 30; FIG. 5 is an exploded perspective view of the camera module 22, the socket 24, and a cover 26; FIG. 6 is a sectional view at the line A-A of FIG. 5; FIG. 7 is a sectional view at the line B-B of FIG. 5; and FIG. 8 is an enlarged view of the portion A of FIG. 7.

As shown in FIGS. 2 and 5, the image pickup apparatus 20 includes the camera module 22; the socket 24, on which the camera module 22 is mounted; and the cover 26 to be mounted on the socket 24.

As shown in FIG. 2, the camera module 22 includes a camera body 28, an image sensing element 29, a signal processor (not shown), a substrate 30, and connection pieces 32 (see FIG. 4).

The camera body 28 includes a rectangular plate-like upper surface 2802 defining one plane in the thickness direction, a lower surface 2804 defining the other plane in the thickness direction, two longer-side lateral faces 2806 arranged along the longer side, and two shorter-side lateral faces 2808 arranged along the shorter side.

An imaging optical system 34 is assembled in the camera body 28 for directing object images to the image sensing element 29 (see FIG. 7), and is arranged to oppose the upper surface 2802 of the camera body 28.

According to the embodiment, as shown in FIG. 2, the camera body 28 made of a synthetic resin is provided with a shielding plate 2810 for covering the upper surface 2802 and the two longer-side lateral faces 2806, so that the camera body 28 includes the shielding plate 2810 according to the embodiment.

The shielding plate 2810 is formed of one plate having electro-magnetically shielding properties, and includes an upper surface part 2810A for covering the upper surface 2802 and lateral face parts 2810B for covering the two longer-side lateral faces 2806.

The material of the shielding plate 2810 having electro-magnetically shielding properties may include an electric conductive material having no magnetic property, such as phosphor bronze, nickel silver, a tin plate, copper, a copper alloy such as phosphor bronze having nickel plated thereon, or stainless steal (SUS304, for example). If a magnetic substance is used for the material having electro-magnetically shielding properties, it has the effect of magnetic flux shielding properties in addition to that of the electro-magnetically shielding properties.

The image sensing element 29 is assembled at a position within the camera body 28 and rearward the imaging optical system 34 for picking up object images directed by the imaging optical system 34.

The signal processor performs predetermined signal processing by taking an imaging signal from the image sensing element 29.

The substrate 30, as shown in FIG. 2, is formed in a rectangular shape, and is attached on the lower surface 2804 of the camera body 28.

On the top surface 3002 of the substrate 30 facing the camera body 28, a plurality of electronic components 31 constituting the image sensing element 29 and the signal processor are mounted.

As shown in FIG. 4, a plurality of connection pieces 32 (connection pads) are juxtaposed along two longer sides of the bottom surface 3004 of the substrate 30 facing oppositely to the camera body 28.

As shown in FIG. 2, the socket 24 includes a socket body 36, socket shielding plates 38, elastic pieces 40, a plurality of connection terminals 42, and an engagement part 68 (see FIG. 7).

The socket body 36 is made of an insulating material, and according to the embodiment, it is made of an insulating synthetic resin.

The socket body 36 includes a rectangular bottom wall 3602 with a contour larger than that of the substrate 30 and four side walls 3604 raised from four sides of the bottom wall 3602, respectively, so that the camera module 22 can be accommodated on the bottom wall 3602 within a space surrounded with the four side walls 3604.

According to the embodiment, the four side walls 3604 are composed of two longer-side side walls 3606 raised from two longer sides of the bottom wall 3602 and two shorter-side side walls 3608 raised from two shorter sides of the bottom wall 3602.

As shown in FIGS. 2 and 3, at two longer sides opposing each other of the bottom wall 3602, a plurality of notches 3610 are juxtaposed along these longer sides for arranging a plurality of the connection terminals 42 therein.

A plurality of the connection terminals 42, as shown in FIGS. 3, 6, and 7, are arranged at the notches 3610 of the bottom wall 3602 elastic-deformably in the thickness direction of the bottom wall 3602 so as to be connected to the connection pieces 32 of the substrate 30, respectively.

The socket 24 is mounted on a substrate (not shown) provided in the electronic instrument 10, and the rear anchors of a plurality of the connection terminals 42 are electrically connected to connection pads on the substrate via solders, respectively.

As shown in FIG. 2, each of the longer-side side walls 3606 includes a notched portion 3620 extended along the longer-side side wall 3606 in the longitudinal direction for accommodating the elastic pieces 40 therein; each of the shorter-side side walls 3608 includes two notched portions 3630 arranged apart in the longitudinal direction of the shorter-side side wall 3608 for accommodating the elastic pieces 40 therein.

The four socket shielding plates 38 are provided so as to cover the four side walls 3604, respectively.

According to the embodiment, the socket body 36 is constituted by including the socket shielding plates 38.

The four side walls 3604 include respective inner surfaces facing each other and respective outer surfaces positioned opposite to the inner surfaces, and the socket shielding plates 38 are arranged to cover the respective outer surfaces of the side walls 3604.

According to the embodiment, the socket shielding plates 38 include two longer-side shielding plates 46 to be assembled to the two longer-side side walls 3606, respectively, and two shorter-side shielding plates 48 to be assembled to the two shorter-side side walls 3608, respectively.

The socket shielding plates 38 are made of a material having electro-magnetically shielding properties and elasticity, so that by covering the outer surfaces of the four side walls 3604 of the socket body 36 therewith so as to cover the four side-faces (the longer-side lateral faces 2806 and the shorter-side lateral faces 2808) of the camera body 28, the four side-faces of the camera body 28 are electro-magnetically shielded. The material of the socket shielding plates 38 having electro-magnetically shielding properties and elasticity may include an electric conductive material having no magnetic properties, such as phosphor bronze, nickel silver, a tin plate, copper, a copper alloy such as phosphor bronze having nickel plated thereon, or stainless steal (SUS304, for example). If a magnetic substance is used for the material having electro-magnetically shielding properties, it has the effect of magnetic flux shielding properties in addition to that of the electro-magnetically shielding properties.

Specifically, at upper edges of the socket shielding plates 38 (the longer-side shielding plates 46 and the shorter-side shielding plates 48), mounting pieces 38A are provided by bending apart in the extending direction. By inserting the mounting pieces 38A into mounting grooves 36A provided on end-faces of the side walls 3604 (the longer-side side walls 3606 and the shorter-side side walls 3608) of the socket body 36, respectively, the socket shielding plates 38 are attached over the outer surfaces of the side walls 3604 (the longer-side side walls 3606 and the shorter-side side walls 3608).

Then, the socket shielding plates 38 are grounded by being connected to the reference potential (ground level) of the electronic instrument 10. For example, part of the socket shielding plates 38 is connected for grounding to a connection pad for the reference potential (ground level) provided on the substrate of the electronic instrument 10 by soldering.

The elastic pieces 40 are arranged integrally with the socket shielding plate 38, and for each socket shielding plate 38, the two elastic pieces 40 are provided apart in the longitudinal direction of the socket shielding plate 38.

As shown in FIG. 2, the elastic piece 40 formed integrally with the socket shielding plate 38 extends toward the bottom wall 3602 inside the inner surfaces of the four side walls 3604 via a flection 4001 from the upper end the socket shielding plate 38 spaced from the bottom wall 3602.

The elastic pieces 40 are located inside the inner surfaces of the side walls 3606 and 3608 in the state that the socket shielding plates 38 are attached on the side walls 3606 and 3608 of the socket body 36, respectively, via the mounting pieces 38A.

More specifically, in each of the longer-side side walls 3606, the elastic pieces 40 are arranged to face the notched portion 3620 while in each of the shorter-side side walls 3608, the elastic pieces 40 are arranged to face the notched portions 3630, respectively. The elastic piece 40 is elastically deformable in the thickness direction of each of the side walls 3606 and 3608. More specifically, the elastic deformation of the elastic pieces 40 toward the outer surface of each of the side walls 3606 and 3608 is performed inside the notched portions 3620 and 3630.

As shown FIGS. 6 and 7, the elastic piece 40 is provided with the flection 4002 located at the intermediate portion and protruded inside the socket body 36. When in the state that the camera module 22 is accommodated within the socket body 36, the flections 4002 come in contact with the longer-side lateral faces 2806 and the shorter-side lateral faces 2808 of the camera body 28, respectively, the camera module 22 is elastically supported while securing a space S1 between the inner surfaces of the lateral faces 2806 and 2808.

More specifically, since the shielding plate 2810 is attached to the camera body 28 and the side portions 2810B of the shielding plate 2810 are located on the longer-side lateral faces 2806 of the camera body 28, respectively, according to the embodiment, the flections 4002 do not come in direct contact with the longer-side lateral faces 2806 of the camera body 28 but come in contact with the side portions 2810B of the shielding plate 2810. In other words, the flections 4002 come in indirect contact with the longer-side lateral faces 2806 of the camera body 28 via the side portions 2810B of the shielding plate 2810. Thus, according to the embodiment, by the abutment of the elastic pieces 40 of the longer-side shielding plates 46 to the respective side portions 2810B of the shielding plate 2810, the shielding plate 2810 for the camera body is grounded via the longer-side shielding plates 46.

Figure 9:
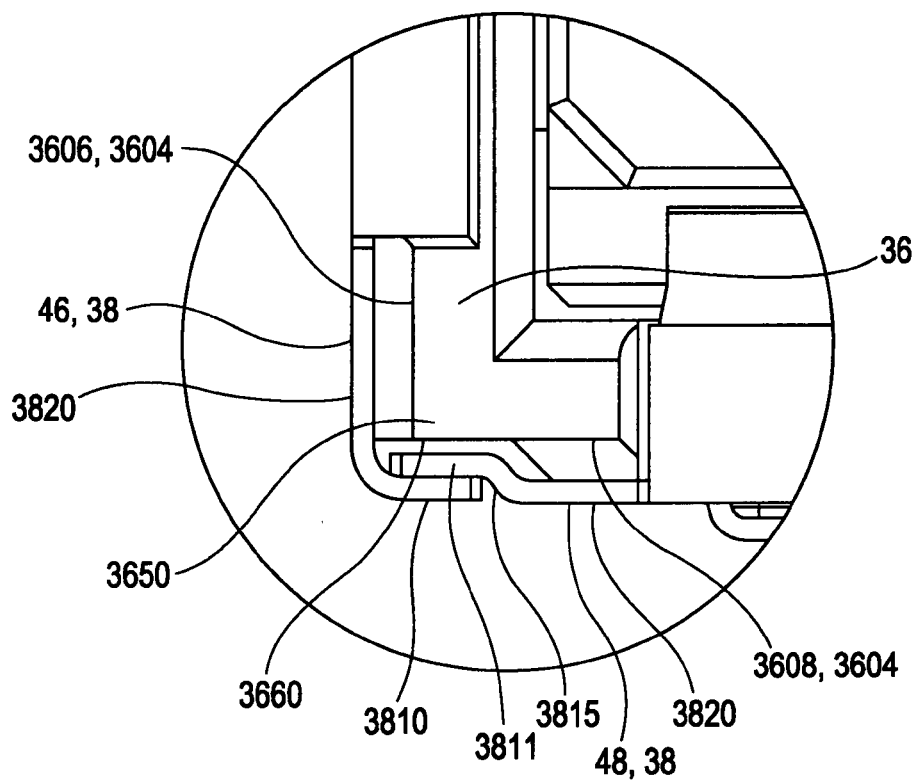
FIG. 9 is a drawing viewed in the arrow C direction of FIG. 5.

As shown in FIG. 9, which is the drawing viewed in the arrow C direction of FIG. 5, both ends of each of the socket shielding plates 38 in the longitudinal direction are overlapped and electrically conducted with each other at the four corners of the socket body 36, so that the entire side faces of the socket body 36 are electro-magnetically shielded over the entire region with the four socket shielding plates 38. More specifically, for example, at one ends of the socket shielding plates 38 adjacent to each other, flection plates 3810 are formed, and the flection plates 3810 are overlapped with the other ends 3811 of the socket shielding plates 38 adjacent to each other, respectively, so that the flection plate 3810 and the other end 3811 are always urged to each other in a direction touching each other by the elasticity included in the socket shielding plates 38.

As shown in FIG. 7, when the camera module 22 is accommodated inside the four side walls 3604 on the bottom wall 3602, the engagement part 68 is engaged with part of the camera module 22 so as to suppress the movement of the camera module 22 in the separating direction from the bottom wall 3602 of the socket 24. The camera module 22 is accommodated inside the four side walls 3604 on the bottom wall 3602 so that the engagement part 68 engages with part of the camera module 22 so as to form the mounting state of the camera module 22 on the socket 24.

In the mounting state of the camera module 22, a plurality of the connection terminals 42 are elastically deformed and electrically connected to a plurality of the connection pieces 32 of the substrate 30, respectively, while the camera module 22 is urged in the direction of the upper surface 2802 of the camera body 28. Thereby, in the state that a space S2 is secured between the substrate 30 of the camera module 22 and the bottom wall 3602 of the socket 24, the connection pieces 32 of the substrate 30 can be always elastically brought into contact with the connection terminals 42 securely.

The engagement part 68 is provided in the socket body 36, and according to the embodiment, the engagement part 68 is formed of the flection 4002 of the elastic piece 40 of the socket shielding plate 38 attached on the shorter-side side wall 3608. When the camera module 22 is inserted inside the socket 24, by retaining the flection 4002 onto a projection 2820 of the shorter-side lateral face 2808 of the camera body 28, the movement of the camera module 22 is prevented from separating from the bottom wall 3602 of the socket 24.

As shown in FIGS. 5 and 7, each of the shorter-side side walls 3608 of the socket body 36 is provided with a stopper 62 for preventing the cover 26 from moving toward the upper surface 2802 of the camera body 28 by abutting part of the cover 26.

According to the embodiment, the stopper 62 is configured of two retaining projections 4802 protruded from the outer surface of the shorter-side shielding plate 48 and arranged apart in the longitudinal direction.

According to the embodiment, as shown in FIG. 5, each of the longer-side side walls 3606 of the socket body 36 is provided with a positioning engagement part 64 for positioning the cover 26 relative to the socket 24 in the thickness direction of the camera body 28 by disengageably engaging with the cover 26.

According to the embodiment, the positioning engagement part 64 is composed of two engagement concave structures 6402 formed on the outer surface of the longer-side shielding plate 46 arranged apart in the longitudinal direction of the longer-side shielding plate 46.

The cover 26 is made of a material having electro-magnetically shielding properties and elasticity. The material having electro-magnetically shielding properties and elasticity may include an electric conductive material having no magnetic properties, such as phosphor bronze, nickel silver, a tin plate, copper, a copper alloy such as phosphor bronze having nickel plated thereon, or stainless steal (SUS304, for example). If a magnetic substance is used for the material having electromagnetically shielding properties, it has the effect of magnetic flux shielding properties in addition to that of the electro-magnetically shielding properties.

As shown in FIGS. 5 and 7, the cover 26 includes an upper surface part 50 and a side-face part 52.

The upper surface part 50 covers the upper surface 2802 of the camera body 28 and the side-face part 52 covers the four socket shielding plates 38.

The upper surface part 50 is provided with an opening 5002 formed at a position facing the imaging optical system 34, and a transparent lens cover 58 is provided at the opening 5002.

Specifically, the disk-shaped lens cover 58 is bonded on the outer surface of the upper surface part 50 with an annular double-faced adhesive tape 5802.

On the inner surface of the upper surface part 50, an annular dust-proof member 60 made of an elastic material is provided which extends along the periphery of the opening 5002. The dust-proof member 60 is bonded on the inner surface of the upper surface part 50 with an annular double-faced adhesive tape 6002. The elastic material of the dust-proof member 60 may include a spongy material such as foamed polyurethane.

As shown in FIG. 5, the side-face part 52 includes longer-side side-face parts 54 covering the two longer-side shielding plates 46 of the socket 24 and shorter-side side-face parts 56 covering the two shorter-side shielding plates 48 of the socket 24.

By retaining the lower edges of the shorter-side side-face parts 56 of the cover 26 onto retaining projections 4802 of the socket shielding plates 38, the cover 26 is prevented from displacing toward the upper surface 2802 of the camera body 28.

The longer-side side-face parts 54 of the cover 26 are provided with retaining projections 5402 formed at positions on the inner surfaces corresponding to the engagement concave structures 6402 of the socket 24 for engaging/disengaging with the engagement concave structures 6402, respectively. By the respective engagement of the retaining projections 5402 with the engagement concave structures 6402, the cover 26 is positioned in the thickness direction of the camera body 28.

In such a manner, the side-face part 52 of the cover 26 disengageably engage with the socket shielding plates 38 of the socket body 36, and by providing the engagement concave structures 6402 and the retaining projections 5402 for positioning the cover 26 relative to the socket 24, the dropping of the cover 26 from the socket 24 can be advantageously prevented. These are advantageous in work efficiency when the image pickup apparatus 20 is treated as a single body or when the image pickup apparatus 10 is assembled in the electronic instrument 10.

According to the embodiment, in the state that the cover 26 is mounted on the socket 24 having the camera module 22 mounted thereon, the retaining projections 5402 are engaged with the engagement concave structures 6402, respectively, while the lower edges of the shorter-side side-face parts 56 of the cover 26 are retained onto the retaining projections 4802 of the socket shielding plates 38, respectively.

In the assembling of the image pickup apparatus 20, on the socket 24 mounted on the substrate of the electronic instrument 10, the camera module 22 is installed so as to mount the cover 26 on the socket 24 from thereon, thereby completing the image pickup apparatus 20.

Then, the image pickup apparatus 20 configured in such a manner, as shown in FIG. 1A, is built within the first casing 14 of the electronic instrument 10 in the state that the lens cover 58 faces an opening 1410 formed on the first casing 14.

The configurations described above have the following effects.

Since the cover 26 of the image pickup apparatus 20 is provided with the lens cover 58, the electronic instrument 10 is not necessary to have the lens cover built therein so as to obviously simplify the assembling work of the electronic instrument 10. Moreover, since the cover 26 is retained to the socket 24 via the stopper 62, even if an external force is directly applied to the lens cover 58 in the direction toward the upper surface 2802 of the camera body 28, the external force is not applied to the camera module 22 but applied to the socket 24 via the cover 26 and the stopper 62, so that the influence of the external force on the image pickup apparatus 20 can be advantageously alleviated.

Thus, it is effectively prevented that an external force is applied to the image sensing element 29 and the substrate via the camera body 28 of the camera module 22 so as to deform the image sensing element 29, resulting in the distortion of picked-up images, or that a mechanical stress is applied to electronic components mounted on the substrate.

Since the camera module 22 is elastically supported with the elastic pieces 40 and the connection terminals 42, even if large impact or vibration is applied to the image pickup apparatus 20 built in the electronic instrument 10 due to the collision of the electronic instrument 10 with an object or the dropping of the electronic instrument 10 onto the floor, the impact or vibration is alleviated with the elastic pieces 40 and the connection terminals 42 so as to transmit it to the camera module 22, improving the durability of the image pickup apparatus 20 against impact or vibration.

According to the embodiment, the shielding plate 2810 of the camera module 22, the longer-side side-face parts 54 and the shorter-side side-face parts 56 of the cover 26, and the longer-side shielding plates 46 and the shorter-side shielding plates 48 of the socket 24 are overlapped into contact with each other so as to be electrically conductive, so that the camera-body shielding plate 2810 and the cover 26 are grounded via the socket shielding plates 38 of the socket 24.

Hence, the camera module 22 is electro-magnetically shielded with the shielding plate 2810, the socket shielding plates 38, and the cover 26, which are overlapped with each other, so that the electro-magnetic shielding between the image sensing element 29 and the signal processor within the camera body 28 and electronic circuits of the electronic instrument 10 arranged in the vicinity of the image pickup apparatus 20 can be securely performed, so that the mutual electro-magnetic radiation between the image sensing element 29 and the signal processor within the camera body 28 and the electronic circuits can be effectively suppressed. Thus, while harmful effects due to the electro-magnetic radiation is prevented, the image pickup apparatus 20 can be arranged in close proximity with the electronic circuits, thereby reducing the electronic instrument in size and thickness.

In particular, in the signal processor connected to the subsequent stage of the image sensing element 29 provided within the camera module 22, because of a used high-frequency clock, the radiation of high-frequency clock noise may occur; whereas, the radiation of the electromagnetic waves can be efficiently suppressed with the camera-body shielding plates 2810, the socket shielding plates 38, and the cover 26, which are overlapped with each other.

Even when electromagnetic waves are radiated by an actuator that is built within the camera module 22 for moving part of lenses constituting the imaging optical system 34 in the optical axial direction as focusing operation and zooming operation, the radiation of the electromagnetic waves can be efficiently suppressed with the camera-body shielding plates 2810, the socket shielding plates 38, and the cover 26, which are overlapped with each other.

When the electronic instrument 10 includes electronic components, such as a speaker, an antenna, and the liquid crystal display panel 1402 mounted over a limited space in high density, like in a mobile phone, electromagnetic interference (EMI) may occur between these electronic components and the camera module 22; whereas, according to the embodiment, by providing the camera-body shielding plates 2810, the socket shielding plates 38, and the cover 26, the EMI can be efficiently suppressed, so that this is especially advantageous when the image pickup apparatus 20 is built in the electronic instrument having electronic components mounted in high density like in the mobile phone.

According to the embodiment, as shown in FIG. 7, in the state of the cover 26 mounted on the socket 24, the space between the upper surface part 50 of the cover 26 and the upper surface 2802 of the camera body 28 is sealed with the dust-proof member 60 of the cover 26, so that the clearance between the front of the imaging optical system 34 and the lens cover 58 is hermetically sealed. Accordingly, dust or dirt can be securely prevented from penetrating into the front of the imaging optical system 34 through the clearance between the cover 26 and the camera body 28.

Second Embodiment

Then, a second embodiment will be described.

According to the second embodiment, the configuration of the stopper 62 is different from that of the first embodiment and other configurations are the same as those of the first embodiment.

Figure 10:
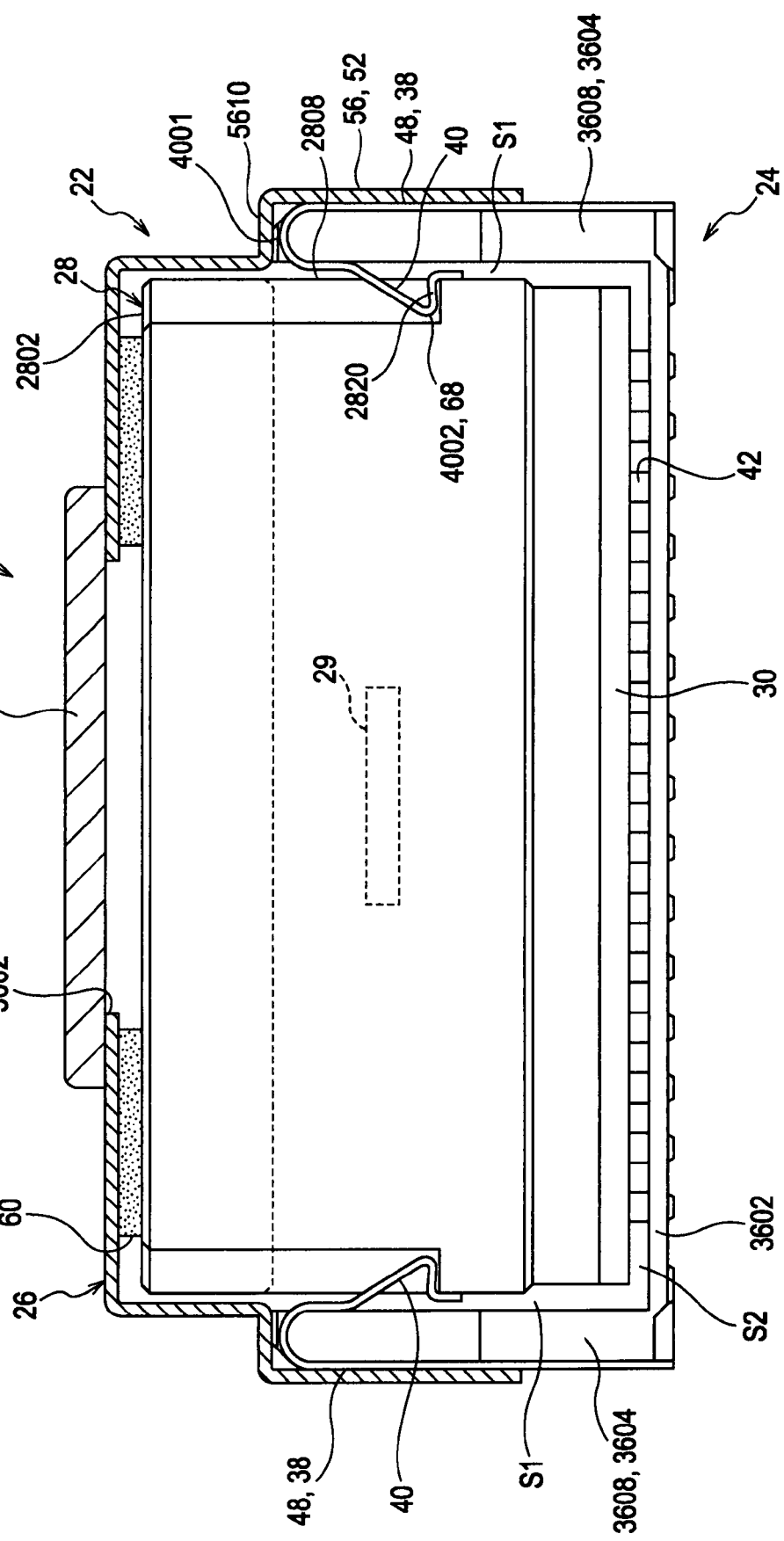
FIG. 10 is a sectional view of an image pickup apparatus 20 according to a second embodiment.

FIG. 10 is a sectional view of the image pickup apparatus 20 according to the second embodiment. In the following description of the second embodiment, like reference characters designate like components common to the first embodiment.

According to the first embodiment, the stopper 62 is configured of two retaining projections 4802 protruded from the outer surface of the shorter-side shielding plate 48 and arranged apart in the longitudinal direction; whereas, according to the second embodiment, a point that the stopper 62 is configured of the flection 4001 formed at the upper end of each of the shorter-side shielding plates 48 is different from that of the first embodiment and other configurations are the same as those of the first embodiment.

According to the second embodiment, as shown in FIG. 10, a retainer 5610 is formed in each of the shorter-side side-face parts 56 of the cover 26 for retaining to the flection 4001. By retaining the retainer 5610 onto the flection 4001, the cover 26 is prevented from displacing toward the upper surface 2802 of the camera body 28.

In such a manner, the second embodiment obviously has the same effect as described above.

In the configurations described above, the stopper 62 is configured of two retaining projections 4802 protruded from the outer surface of the shorter-side shielding plate 48 and arranged apart in the longitudinal direction; alternatively, the stopper 62 is configured of the flection 4001 formed at the upper end of each of the shorter-side shielding plates 48; however, the stopper 62 may also be formed at the upper end of the socket shielding plate 38 of the socket body 36.

Also, the four socket shielding plates 38 are provided; however, the number of the socket shielding plates 38 is optional, so that it may be one, two, or three.

Then, the essential part according to the embodiment of the present invention will be described in detail.

As shown in FIG. 2, in the image pickup apparatus 20 as described above, each of the four side walls 3604 is provided with the elastic piece 40 that is elastically brought into contact with each of the four side walls (the two longer-side lateral faces 2806 and the two shorter-side lateral faces 2808) of the camera body 28 so as to elastically support the camera module 22 inside the four side walls 3604 and on the bottom wall 3602 while securing spaces S1 to the four side walls 3064 in a state of the plurality of the connection pieces 32 connected to the plurality of the connection terminals 42, respectively.

The elastic piece 40 is provided to be elastically deformable in the thickness direction of the side wall 3604 where the elastic piece 40 is arranged.

At a position of each side wall 3604 corresponding to the elastic piece 40, the elastic deformation notched portions 3620 and 3630 are formed for the elastic piece 40 in elastically deforming.

According to the embodiment, the elastic deformation notched portions 3620 and 3630 are formed to penetrate the side walls 3604 in the thickness direction of the side walls 3604.

According to the embodiment, as shown in FIG. 2, the two elastic pieces 40 are elastically brought into contact at two positions of each of the side walls 3604 located apart in the longitudinal direction of the side wall 3604.

Also, the two elastic deformation notched portions 3630 provided in the shorter-side side walls 3608 are arranged at two positions of the side wall 3604 respectively corresponding to the two elastic pieces 40.

The elastic deformation notched portion 3620 provided in each of the longer-side side walls 3606 is a single notched portion with a size deformable for the two elastic pieces 40.

The elastic deformation notched portions 3620 and 3630 are formed to penetrate the side walls 3604 in the thickness direction of the side walls 3604 so as to open at the upper end of the side walls 3604 separated from the bottom wall 3602.

In the image pickup apparatus 20, as described above, the socket shielding plates 38 formed of a material having electro-magnetically shielding properties and elasticity are provided for covering the four side walls 3604, in which the socket shielding plate 38 is attached on each of the side walls 3604, and the elastic piece 40 is formed integrally with the socket shielding plate 38.

The four side walls 3604 include respective inner surfaces facing each other and respective outer surfaces positioned opposite to the inner surfaces, and the socket shielding plates 38, as shown in FIG. 2, include body plate parts 3820 attached to each of the side walls 3604 for covering the outer surface of each of the side walls 3604.

The elastic piece is formed integrally with the body plate part.

The elastic piece 40, as shown in FIG. 2, extends from the upper end of the body plate part 3820 separated from the bottom wall 3602 toward the bottom wall 3602 separated from the body plate part 3820 in the inner surface direction of the side wall 3604 via the first flection 4001.

The body plate part 3820 is formed integrally with a mounting piece 38A.

The mounting piece 38A extends from the upper end of the body plate part 3820 separated from the bottom wall 3602 as well as separated from the first flection 4001 toward the bottom wall 3602 separated from the body plate part 3820 in the inner surface direction of the side wall 3604 via a second flection 3801.

The socket shielding plate 38 is attached on the side wall 3604 by inserting the mounting piece 38A into the mounting groove 36A extending in the height direction of the side wall 3604 to open at the upper end of the side wall 3604 so as to pinch part of the side wall 3604 forming the mounting groove 36A between the mounting piece 38A and the body plate part 3820.

At a position corresponding to the elastic deformation notched portion 3620, which is the single notched portion provided in the longer-side side wall 3606, a folded piece 3803 is provided for covering the elastic deformation notched portion 3620 (the single notched portion), the folded piece 3803 extending from the upper end of the body plate part 3820 separated from the bottom wall 3602 toward the bottom wall 3602 separated from the body plate part 3820 in the inner surface direction of the side wall 3604 via a third flection 3802, so that the electromagnetically shielding properties are improved with the folded piece 3803 and the body plate part 3820.

The two elastic pieces 40 provided in the longer-side side walls 3606 are formed in the folded piece 3803 via a notch 3804, together with the two first flections 4001.

According to the embodiment, since the camera module 22 is elastically supported with the elastic pieces 40 while securing the space S1 to the side walls 3604, even when large impact or vibration is laterally applied to the electronic instrument 10 or the image pickup apparatus 20, the impact or vibration is alleviated by the elastic pieces 40.

Also, since the elastic pieces 40 are elastically deformable in the thickness direction of the side walls 3604 and the elastic deformation notched portions 3620 and 3630 are formed in the side walls 3604 for the elastic pieces 40 in deforming, the large elastic stroke of the elastic piece 40 can be ensured without increasing the image pickup apparatus 20 in size.

Accordingly, the camera module 22 can be securely supported elastically with the elastic pieces 40 while the image pickup apparatus 20 is being miniaturized, thereby improving the durability against impact or vibration of the camera module 22 and the image pickup apparatus 20.

According to the embodiment, the elastic deformation notched portions 3620 and 3630 are formed to penetrate the side walls 3604 in the thickness direction of the side walls, so that the large elastic stroke of the elastic piece 40 can be advantageously ensured without increasing the image pickup apparatus 20 in size. Accordingly, the camera module 22 can be securely supported elastically with the elastic pieces 40 while the image pickup apparatus 20 is being miniaturized, thereby improving the durability against impact or vibration of the camera module 22 and the image pickup apparatus 20.

According to the embodiment, the elastic deformation notched portions 3620 and 3630 are also formed to open at the upper ends of the side walls 3604 separated from the side walls 3604, so that when the socket body 36 is molded, the socket body 36 can be simply and inexpensively manufactured, advantageously reducing cost of the camera module 22 and the image pickup apparatus 20.

According to the embodiment, the elastic pieces 40 are also formed integrally with the socket shielding plates 38 by employing the socket shielding plates 38, so that the number of the components of the camera module 22 and the image pickup apparatus 20 is reduced smaller than that when the elastic pieces 40 are provided separately from the socket shielding plates 38, advantageously reducing the cost.

According to the embodiment, while the elastic pieces 40 are formed integrally with the socket shielding plates 38 by employing the socket shielding plates 38, the mounting pieces 38A are formed integrally with the socket shielding plates 38 and by inserting the mounting pieces 38A into the mounting grooves 36A, respectively, the socket shielding plates 38 are attached on the side walls 3604, respectively, so that the elastic pieces 40 and the socket shielding plates 38 can be simply assembled, advantageously reducing cost of the camera module 22 and the image pickup apparatus 20.

According to the embodiment, the elastic pieces 40 function as members elastically supporting the camera module 22 also as members electromagnetically shielding the camera module 22 at positions of the elastic pieces 40 shown in FIGS. 6 and 7, so that at these positions of the elastic pieces 40, the camera module 22 is doubly shielded advantageously with the elastic pieces 40 and the body plate parts 3820.

According to the embodiment, the electronic instrument 10 having the image pickup apparatus 20 built therein has been a mobile phone; however, the image pickup apparatus according to the embodiment of the present invention may also be widely applied to information terminals, such as PDAs and notebook personal computers, or various electronic instruments, such as digital still cameras and video cameras.

Then, the configuration of the socket shielding plate will be described.

As described above, in the image pickup apparatus 20, the four side walls 3604 include respective inner surfaces facing each other and respective outer surfaces positioned opposite to the inner surfaces as shown in FIG. 2, and a plurality of socket shielding plates 38 formed of a material having electro-magnetically shielding properties and elasticity are provided for covering the outer surfaces of the four side walls 3604 by attaching them on each of the side walls 3604, so that the socket shielding plate 38 is attached on the side wall 3604 by inserting the mounting piece 38A into a mounting groove 36A.

As shown in FIG. 9, one ends 3810 and 3811 of the socket shielding plates 38 adjacent to each other overlap at a corner 3650, where the side walls 3604 adjacent to each other of the socket body 36 intersect, so as to urge each other in a direction touching each other by the elasticity included in the socket shielding plates 38.

As shown in FIGS. 2 to 9, the four socket shielding plates 38 are provided to correspond to the four side walls 3604, and the ends 3810 and 3811 of the socket shielding plates 38 adjacent to each other overlap at the four corners 3650 so as to urge each other in a direction touching each other by the elasticity included in the socket shielding plates 38.

Figure 11:
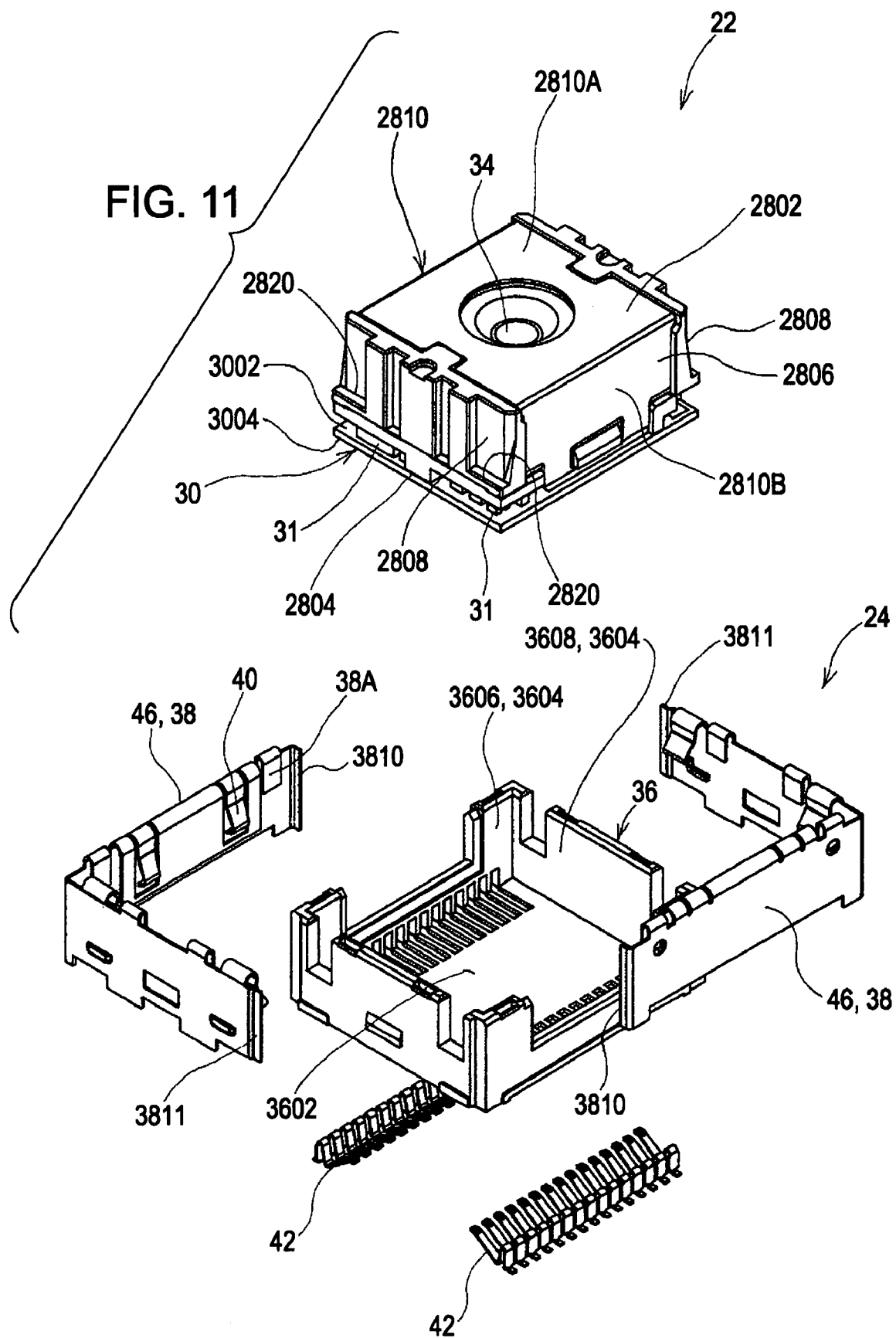
FIG. 11 is an exploded perspective view of a camera module 22 and a socket 24 constituting an image pickup apparatus 20 according to another embodiment.

As shown in FIG. 11, the two socket shielding plates 38 are provided to cover the two side walls 3604 adjacent to each other among the four side walls 3604, and the ends 3810 and 3811 of the socket shielding plates 38 adjacent to each other overlap at the two corners 3650 so as to urge each other in a direction touching each other by the elasticity included in the socket shielding plates 38.

The ends 3810 and 3811 of the socket shielding plates 38 adjacent to each other have the same height as that of the side walls 3604.

As shown in FIGS. 2, 9, and 11, at the corner 3650, a concave structure 3660 is formed to extend in the height direction of the side wall 3604 along the entire length.

The ends 3810 and 3811 of the socket shielding plates 38 adjacent to each other overlap within the concave structure 3660 along the entire length of the concave structure 3660 so as to urge each other in a direction touching each other.

Upon describing the ends 3810 and 3811 of the socket shielding plates 38 adjacent to each other in detail, as shown in FIG. 9, the one end 3810 is formed as a first abutment section 3810 folded at a right angle from the end of the body plate part 3820 arranged in parallel with the side wall 3604 to cover the side wall 3604. The first abutment section 3810 has the same height as that of the side wall 3604.

The other end 3811 is formed as a second abutment section 3811 that linked to the end of the body plate part 3820 via a flection 3815 to extend in parallel with the body plate part 3820 after being displaced by the thickness of the socket shielding plate 38 toward the inner surface of the side wall 3604. The second abutment section 3811 has the same height as that of the side wall 3604.

In the socket shielding plates 38 adjacent to each other, such first and second abutment sections 3810 and 3811 are overlapped with each other so as to urge each other in a height direction touching each other along the entire length.

By such configurations, the first abutment section 3810 of the socket shielding plates 38 adjacent to each other is overlapped with the second abutment section 3811 so as to urge each other in a direction touching each other by the elasticity included in the socket shielding plates 38, so that while the entire outer periphery of the four side walls 3604 of the socket body 36 is covered with a plurality of the socket shielding plates 38, the plurality of the socket shielding plates 38 are electrically connected together, thereby electromagnetically shielding the camera module 22 mounted on the socket 24 for sure even when impact or vibration is applied thereto.

By such configurations, the first and second abutment sections 3810 and 3811 are also overlapped with each other at the corner 3650 where the side walls 3604 adjacent to each other of the socket body 36 intersect, so that the contact pressure between the first and second abutment sections 3810 and 3811 can be strongly ensured by the elasticity included in the socket shielding plates 38, and this is advantageous in electrically connecting the socket shielding plates 38 adjacent to each other together.

By such configurations, the first and second abutment sections 3810 and 3811 are brought into contact with each other along the entire length in the height direction as well as urged in a direction touching each other, so that a plurality of the socket shielding plates 38 can be electrically securely connected especially when impact or vibration is applied thereto, thereby electromagnetically shielding the camera module 22. In particular, by such configurations, the first and second abutment sections 3810 and 3811 are formed in a large size, in the same height as that of the side wall 3604, and are brought into contact with each other along the entire length in the height direction as well as urged in a direction touching each other, thereby electromagnetically shielding the camera module 22 for sure even when impact or vibration is applied thereto.

By such configurations, the first and second abutment sections 3810 and 3811 are overlapped within the concave structure 3660, so that defect such as the large outside bulging of overlapped portion of the first and second abutment sections 3810 and 3811 can be prevented, so that this apparatus is advantageous in the compactification of the image pickup apparatus 20.

By such configurations, as shown in FIG. 9, the first abutment section 3810 is overlapped with the second abutment section 3811 that is linked to the end of the body plate part 3820 via the flection 3815 to extend in parallel with the body plate part 3820 after being displaced by the thickness of the socket shielding plate 38 toward the inner surface of the side wall 3604, and the overlapping is performed within the concave structure 3660, so that the first abutment section 3810 and the body plate part 3820, with which the first abutment section 3810 overlaps, extend on the same level, and a rectangular contour without projections are formed with the four socket shielding plates 38 on a plan view, so that this is advantageous in compactification of the image pickup apparatus 20.

By such configurations, when the socket shielding plates 38 are attached on the side walls 3604 by inserting the mounting pieces 38A of the socket shielding plates 38 into the mounting grooves 36A of the socket body 36, respectively, the first and second abutment sections 3810 and 3811 slide by following the displacement of the socket shielding plates 38 while pressing into contact with each other, so that the overlapping of the first and second abutment sections 3810 and 3811 is easy, simplifying the assembly work for reducing cost.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus comprising:
a camera module configured to include a rectangular plate-shaped camera body having an imaging optical system built therein to oppose one plane in a thickness direction, an image sensing element for imaging an object image directed by the imaging optical system, a signal processor for performing predetermined signal processing by taking an imaging signal outputted from the image sensing element, and a substrate attached on the other plane of the camera body in the thickness direction, and a plurality of connection pieces formed on a plane of the substrate opposite to the camera body; and
a socket on which the camera module is mounted,
wherein the socket includes a socket body made of an insulating material with a size acceptable the camera module therein and having a rectangular bottom wall, four side walls raised from four sides of the bottom wall, and a plurality of connection terminals provided on the bottom wall to be connected to the plurality of connection pieces, respectively,
wherein each of the side walls is provided with an elastic piece that is elastically brought into contact with each of four sides continuing to each side of the one plane of the camera body so as to elastically support the camera module inside the four side walls and on the bottom wall, while spaces are being secured to the four side walls, in a state of the plurality of connection pieces connected to the plurality of connection terminals, respectively, and
wherein the elastic piece is provided to be elastically deformable in a thickness direction of the side wall where the elastic piece is arranged, and at a position of each side wall corresponding to the elastic piece, an elastic deformation notched portion is formed for the elastic piece in elastically deforming;
socket shielding plates formed of a material having electromagnetically shielding properties and elasticity for covering the four side walls,
wherein the socket shielding plate is attached on each of the side walls, and
wherein the elastic piece is formed integrally with the socket shielding plate.

2. The apparatus according to claim 1, wherein the elastic deformation notched portion is formed to penetrate the side wall in the thickness direction of the side wall.

3. The apparatus according to claim 1, wherein the elastic deformation notched portion is formed to penetrate the side wall in the thickness direction of the side wall so as to open at the upper end of the side wall separated from the bottom wall.

4. The apparatus according to claim 1, wherein the two elastic pieces are elastically brought into contact at two positions of each of the side walls located apart in the longitudinal direction of the side wall,
wherein the two elastic deformation notched portions are provided at the two positions of the side wall respectively corresponding to the two elastic pieces, and wherein each of the elastic deformation notched portions is formed to penetrate the side wall in the thickness direction of the side wall so as to open at the upper end of the side wall separated from the bottom wall.

5. The apparatus according to claim 1, wherein the two elastic pieces are elastically brought into contact at two positions on each of the side walls located apart in the longitudinal direction of each of the side walls,
    wherein the elastic deformation notched portion is configured as a single notched portion with a size deformable for the two elastic pieces, and
    wherein the single notched portion is formed to penetrate the side wall in the thickness direction of the side wall so as to open at the upper end of the side wall separated from the bottom wall.

6. The apparatus according to claim 1, further comprising socket shielding plates formed of a material having electro-magnetically shielding properties and elasticity,
    wherein the four side walls include respective inner surfaces facing each other and respective outer surfaces positioned opposite to the inner surfaces,
    wherein the socket shielding plates include body plate parts attached to each of the side walls for covering the outer surface of each of the side walls,
    wherein the elastic piece is formed integrally with the body plate part, and
    wherein the elastic piece extends from the upper end of the body plate part separated from the bottom wall toward the bottom wall separated from the body plate part in the inner surface direction of the side wall via a first flection.

7. The apparatus according to claim 1, further comprising socket shielding plates formed of a material having electro-magnetically shielding properties and elasticity,
    wherein the four side walls include respective inner surfaces facing each other and respective outer surfaces positioned opposite to the inner surfaces,
    wherein the socket shielding plates include body plate parts attached to each of the side walls for covering the outer surface of each of the side walls, and the socket shielding plate is formed integrally with the elastic piece and a mounting piece,
    wherein the elastic piece extends from the upper end of the body plate part separated from the bottom wall toward the bottom wall separated from the body plate part in the inner surface direction of the side wall via a first flection,
    wherein the mounting piece extends from the upper end of the body plate part separated from the bottom wall as well as separated from the first flection toward the bottom wall separated from the body plate part in the inner surface direction of the side wall via a second flection, and
    wherein the socket shielding plate is attached on the side wall by inserting the mounting piece into a mounting groove extending in the height direction of the side wall to open at the upper end of the side wall so as to pinch part of the side wall forming the mounting groove between the mounting piece and the body plate part.

8. The apparatus according to claim 1, further comprising socket shielding plates formed of a material having electro-magnetically shielding properties and elasticity,
    wherein the two elastic pieces are elastically brought into contact at two positions on each of the side walls located apart in the longitudinal direction of each of the side walls,
    wherein the elastic deformation notched portion is configured as a single notched portion with a size deformable for the two elastic pieces,
    wherein the single notched portion is formed to penetrate the side wall in the thickness direction of the side wall so as to open at the upper end of the side wall separated from the bottom wall,
    wherein the four side walls include respective inner surfaces facing each other and respective outer surfaces positioned opposite to the inner surfaces,
    wherein the socket shielding plates include body plate parts attached to each of the side walls for covering the outer surface of each of the side walls,
    wherein the two elastic pieces are formed integrally with the body plate parts,
    wherein the two elastic pieces extend from the upper end of the body plate part separated from the bottom wall toward the bottom wall separated from the body plate part in the inner surface direction of the side wall via a first flection,
    wherein at a position corresponding to the single notched portion, a folded piece is provided for covering the single notched portion, the folded piece extending from the upper end of the body plate part separated from the bottom wall toward the bottom wall separated from the body plate part in the inner surface direction of the side wall via a third flection, and
    wherein the folded piece is provided with the two first flections and the two elastic pieces formed via a notch.

9. The apparatus according to claim 1, wherein when the camera module is elastically supported inside the four side walls and on the bottom wall by the elastic pieces, the elastic piece is provided with an engagement part that prevents the camera module from moving away from the bottom wall by engaging with part of the camera module,
    wherein the plurality of connection terminals are provided to be elastically deformable in the thickness direction of the bottom wall, and
    wherein in the state of the engagement part engaged with the camera module, the plurality of connection terminals are elastically deformed and electrically connected to the plurality of connection pieces on the substrate, respectively, so as to urge the camera module toward the one plane of the camera body.

10. The apparatus according to claim 1, further comprising:
    socket shielding plates formed of a material having electro-magnetically shielding properties and elasticity and attached on the side walls, respectively, for covering the four side walls; and
    camera body shielding plates formed of a material having electro-magnetically shielding properties and attached to the camera body to be included in the camera body,
    wherein the camera body shielding plates include a rectangular upper surface part covering the one plane of the camera body and having an opening formed at a position facing the imaging optical system; and side face parts covering two sides of the camera body, which link to two sides opposing each other of the one plane, respectively, and
    wherein the elastic piece is formed integrally with the socket shielding plate, and the elastic pieces facing two sides of the camera body are elastically brought into contact with the side face parts of the camera body shielding plates, respectively.

* * * * *